(12) United States Patent
Han et al.

(10) Patent No.: US 10,932,135 B2
(45) Date of Patent: Feb. 23, 2021

(54) CONTEXT SYSTEM FOR PROVIDING CYBER SECURITY FOR CONNECTED VEHICLES

(71) Applicant: TOYOTA JIDOSHA KABUSHIKI KAISHA, Toyota (JP)

(72) Inventors: Kyungtae Han, Mountain View, CA (US); Hiromitsu Kobayashi, Toyota (JP); Xiaowen Jiang, Mountain View, CA (US)

(*) Notice: Subject to any disclaimer, the term of this patent is extended or adjusted under 35 U.S.C. 154(b) by 0 days.

(21) Appl. No.: 16/457,612

(22) Filed: Jun. 28, 2019

(65) Prior Publication Data

US 2020/0413264 A1 Dec. 31, 2020

(51) Int. Cl.
| | |
|---|---|
| H04W 12/10 | (2009.01) |
| H04W 12/12 | (2021.01) |
| H04W 12/08 | (2021.01) |
| H04W 12/00 | (2021.01) |
| H04W 4/40 | (2018.01) |

(52) U.S. Cl.
CPC ... H04W 12/1204 (2019.01); H04W 12/0051 (2019.01); H04W 12/00505 (2019.01); H04W 12/0802 (2019.01); H04W 12/10 (2013.01); H04W 12/1208 (2019.01); H04W 4/40 (2018.02)

(58) Field of Classification Search
CPC . H04L 67/12; H04L 63/1416; H04L 63/1425; H04L 63/1441; H04L 63/123; H04L 63/02; H04L 63/20; H04L 2209/84; H04L 63/1408; H04L 63/1466; H04L 63/145; H04L 63/18; H04W 12/12; H04W 12/00505; H04W 12/10; H04W 4/48; H04W 4/38; H04W 24/08
See application file for complete search history.

(56) References Cited

U.S. PATENT DOCUMENTS

| | | | | |
|---|---|---|---|---|
| 10,516,681 | B2 * | 12/2019 | Ruvio | H04L 67/12 |
| 10,567,094 | B2 * | 2/2020 | Stinnett | H01Q 1/3216 |
| 2016/0381068 | A1 * | 12/2016 | Galula | B60R 16/0231 |
| | | | | 726/23 |
| 2019/0052653 | A1 * | 2/2019 | Galula | H04L 12/40 |
| 2019/0312896 | A1 * | 10/2019 | Petit | H04L 63/1416 |
| 2019/0356685 | A1 * | 11/2019 | Naserian | H04L 63/1458 |

* cited by examiner

*Primary Examiner* — Liton Miah
(74) *Attorney, Agent, or Firm* — Burbage Law, P.C.; Jon-Michael Burbage; Elizabeth Ruzich

(57) ABSTRACT

The disclosure includes embodiments for providing cybersecurity for connected vehicles. In some embodiments, a method for an ego vehicle includes receiving Vehicle-to-Everything (V2X) data transmitted by a remote vehicle. The V2X data includes context data and registration data of the remote vehicle. The method includes analyzing the V2X data to determine one or more abnormal activities associated with the remote vehicle based at least in part on the context data and the registration data of the remote vehicle. The method includes detecting an occurrence of a cyber-attack event based on the one or more abnormal activities. The method includes, responsive to detecting the occurrence of the cyber-attack event, modifying an operation of a vehicle control system of the ego vehicle to take one or more remedial actions to mitigate the cyber-attack event.

20 Claims, 8 Drawing Sheets

V2X Data

- Vehicles and other client devices equipped with V2X radios transmit a Basic Safety Message ("BSM") at a regular interval.

- Each BSM includes the following V2X data describing one or more of the following for the vehicle that originally sent the BSM:
    (1) GPS Data;
    (2) Heading Data Describing a past Direction of travel for the Vehicle, if any;
    (3) Velocity Data Describing a past Velocity of the Vehicle; and
    (4) Path History of Vehicle (e.g., path history data).
    (5) Context Data describing the context of the transmitting vehicle (e.g., the Remote Vehicle or the Ego Vehicle)
    (6) Registration Data

Figure 5A

V2X Data

Part 1
Sensor Data including:
(1) GPS Data (local 3D)
- Latitude
- Longitude
- Elevation
- Positional accuracy
- Time (2) Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type
Context Data
Registration Data

Figure 5B

CONTEXT SYSTEM FOR PROVIDING CYBER SECURITY FOR CONNECTED VEHICLES

BACKGROUND

The specification relates to providing cyber security for connected vehicles.

Modern vehicles broadcast Vehicle-to-Everything (V2X) messages that include digital data describing their locations, speeds, headings, past actions and future actions, etc. Vehicles that broadcast V2X messages are referred to as "V2X transmitters." Vehicles that receive the V2X messages are referred to as "V2X receivers." The digital data that is included in the V2X messages can be used for the proper operation of Advanced Driver Assistance Systems (ADAS systems) or autonomous driving systems which are included in the V2X receivers. However, in some scenarios the V2X messages may be spoofed or otherwise used in cyber-attacks against the V2X receivers by malicious parties.

SUMMARY

One general aspect of embodiments described herein includes a computer program product including a non-transitory memory of an onboard vehicle computer system of an ego vehicle storing computer-executable code that, when executed by a processor, causes the processor to: execute a cyber-physical registration process with a remote vehicle within a roadway environment of the ego vehicle to generate registration data for the remote vehicle; receive V2X data from the remote vehicle, where the V2X data includes context data and the registration data of the remote vehicle; analyze the V2X data to determine one or more abnormal activities associated with the remote vehicle based at least in part on the context data and the registration data of the remote vehicle; detect an occurrence of a cyber-attack event based on the one or more abnormal activities; and responsive to detecting the occurrence of the cyber-attack event, modify an operation of a vehicle control system of the ego vehicle to take one or more remedial actions to mitigate the cyber-attack event. Other embodiments of this aspect include corresponding computer systems, apparatus, and computer programs recorded on one or more computer storage devices, each configured to perform the actions of the methods.

Implementations may include one or more of the following features. The computer program product where the computer-executable code, when executed by the processor, causes the processor to execute the cyber-physical registration process with the remote vehicle at least by: exchanging a V2X message with the remote vehicle to verify existence of the remote vehicle in the roadway environment; and assigning a unique identifier to the remote vehicle, where the registration data describes the unique identifier of the remote vehicle. The computer program product where the one or more abnormal activities include one or more of an abnormal information reporting, an abnormal physical behavior and an abnormal cyber activity. The computer program product where the computer-executable code, when executed by the processor, causes the processor to analyze the V2X data to determine the one or more abnormal activities associated with the remote vehicle at least by: conducting one or more of a behavioral analysis and a cross-validation analysis on the V2X data to determine the one or more abnormal activities associated with the remote vehicle based at least in part on the context data and the registration data of the remote vehicle. Implementations of the described techniques may include hardware, a method or process, or computer software on a computer-accessible medium.

One general aspect includes a method for an ego vehicle, including: receiving V2X data transmitted by a remote vehicle, where the V2X data includes context data and registration data of the remote vehicle; analyzing the V2X data to determine one or more abnormal activities associated with the remote vehicle based at least in part on the context data and the registration data of the remote vehicle; detecting an occurrence of a cyber-attack event based on the one or more abnormal activities; and responsive to detecting the occurrence of the cyber-attack event, modifying an operation of a vehicle control system of the ego vehicle to take one or more remedial actions to mitigate the cyber-attack event. Other embodiments of this aspect include corresponding computer systems, apparatus, and computer programs recorded on one or more computer storage devices, each configured to perform the actions of the methods.

Implementations may include one or more of the following features. The method further including: executing a cyber-physical registration process with a set of remote vehicles within a roadway environment of the ego vehicle to generate a set of registration data for the set of remote vehicles respectively, where the set of remote vehicles include the remote vehicle and the set of registration data includes the registration data of the remote vehicle. The method where executing the cyber-physical registration process with the set of remote vehicles includes: exchanging a set of V2X messages with the set of remote vehicles to verify existence of the set of remote vehicles in the roadway environment; and assigning a set of unique identifiers to the set of remote vehicles, where the set of registration data describes the set of unique identifiers for the set of remote vehicles respectively. The method where analyzing the V2X data to determine the one or more abnormal activities associated with the remote vehicle includes: conducting a behavioral analysis on the V2X data to determine the one or more abnormal activities associated with the remote vehicle based on one or more of the context data of the remote vehicle, the registration data of the remote vehicle and a first set of sensor data, where the first set of sensor data includes one or more of remote sensor data received from the remote vehicle and ego sensor data generated by the ego vehicle. The method where conducting the behavioral analysis on the V2X data to determine the one or more abnormal activities associated with the remote vehicle includes: conducting one or more of a motion dynamic analysis and a cyber-activity analysis to generate a behavioral analysis result based on the one or more of the context data of the remote vehicle, the registration data of the remote vehicle and the first set of sensor data; identifying the one or more abnormal activities based on the behavioral analysis result; and estimating a behavioral risk based on the one or more abnormal activities. The method where analyzing the V2X data to determine the one or more abnormal activities associated with the remote vehicle includes: conducting a cross-validation analysis on the V2X data to determine the one or more abnormal activities associated with the remote vehicle based on one or more of the context data of the remote vehicle, the registration data of the remote vehicle and a second set of sensor data, where the second set of sensor data includes one or more of remote sensor data received from the remote vehicle, ego sensor data generated by the ego vehicle and other sensor data received from one or more other endpoints. The method where conducting the cross-validation analysis on the V2X data to determine the one or more abnormal activities associated with the remote vehicle includes: performing one or more of a cross-validation for traffic-related information and a cross-validation for service-related information to generate a cross-validation result based on a data cross-comparison of the one or more of the context data of the remote vehicle, the registration data of the remote vehicle and the second set of sensor data; identifying the one or more abnormal activities based on the cross-validation result; and generating one or more abnormality features for the one or more abnormal activities. The method where the one or more abnormal activities include one or more of an abnormal information reporting, an abnormal physical behavior and an abnormal cyber activity. The method where detecting the occurrence of the cyber-attack event based on the one or more abnormal activities includes: matching the one or more abnormal activities to one or more cyber-attack features; and detecting the occurrence of the cyber-attack event based on the one or more cyber-attack features. Implementations of the described techniques may include hardware, a method or process, or computer software on a computer-accessible medium.

One general aspect includes a system including an onboard vehicle computer system of an ego vehicle including a non-transitory memory storing computer code which, when executed by the onboard vehicle computer system, causes the onboard vehicle computer system to: receive V2X data transmitted by a remote vehicle, where the V2X data includes context data and registration data of the remote vehicle; analyze the V2X data to determine one or more abnormal activities associated with the remote vehicle based at least in part on the context data and the registration data of the remote vehicle; detect an occurrence of a cyber-attack event based on the one or more abnormal activities; and responsive to detecting the occurrence of the cyber-attack event, modify an operation of a vehicle control system of the ego vehicle to take one or more remedial actions to mitigate the cyber-attack event. Other embodiments of this aspect include corresponding computer systems, apparatus, and computer programs recorded on one or more computer storage devices, each configured to perform the actions of the methods.

Implementations may include one or more of the following features. The system where the computer code, when executed by the onboard vehicle computer system, causes the onboard vehicle computer system further to: execute a cyber-physical registration process with a set of remote vehicles within a roadway environment of the ego vehicle to generate a set of registration data for the set of remote vehicles respectively, where the set of remote vehicles include the remote vehicle and the set of registration data includes the registration data of the remote vehicle. The system where the computer code, when executed by the onboard vehicle computer system, causes the onboard vehicle computer system to execute the cyber-physical registration process with the set of remote vehicles at least by: exchanging a set of V2X messages with the set of remote vehicles to verify existence of the set of remote vehicles in the roadway environment; and assigning a set of unique identifiers to the set of remote vehicles, where the set of registration data describes the set of unique identifiers for the set of remote vehicles respectively. The system where the computer code, when executed by the onboard vehicle computer system, causes the onboard vehicle computer system to analyze the V2X data to determine the one or more abnormal activities associated with the remote vehicle at least by: conducting a behavioral analysis on the V2X data to determine the one or more abnormal activities associated with the remote vehicle based on one or more of the context data of the remote vehicle, the registration data of the remote vehicle and a first set of sensor data, where the first set of sensor data includes one or more of remote sensor data received from the remote vehicle and ego sensor data generated by the ego vehicle. The system where the computer code, when executed by the onboard vehicle computer system, causes the onboard vehicle computer system to conduct the behavioral analysis on the V2X data to determine the one or more abnormal activities associated with the remote vehicle at least by: conducting one or more of a motion dynamic analysis and a cyber-activity analysis to generate a behavioral analysis result based on the one or more of the context data of the remote vehicle, the registration data of the remote vehicle and the first set of sensor data; identifying the one or more abnormal activities based on the behavioral analysis result; and estimating a behavioral risk based on the one or more abnormal activities. The system where the computer code, when executed by the onboard vehicle computer system, causes the onboard vehicle computer system to analyze the V2X data to determine the one or more abnormal activities associated with the remote vehicle at least by: conducting a cross-validation analysis on the V2X data to determine the one or more abnormal activities associated with the remote vehicle based on one or more of the context data of the remote vehicle, the registration data of the remote vehicle and a second set of sensor data, where the second set of sensor data includes one or more of remote sensor data received from the remote vehicle, ego sensor data generated by the ego vehicle and other sensor data received from one or more other endpoints. The system where the computer code, when executed by the onboard vehicle computer system, causes the onboard vehicle computer system to conduct the cross-validation analysis on the V2X data to determine the one or more abnormal activities associated with the remote vehicle at least by: performing one or more of a cross-validation for traffic-related information and a cross-validation for service-related information to generate a cross-validation result based on a data cross-comparison of the one or more of the context data of the remote vehicle, the registration data of the remote vehicle and the second set of sensor data; identifying the one or more abnormal activities based on the cross-validation result; and generating one or more abnormality features for the one or more abnormal activities. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 5A-5B are graphical representations illustrating example V2X data according to some embodiments.

DETAILED DESCRIPTION

Figure 1:
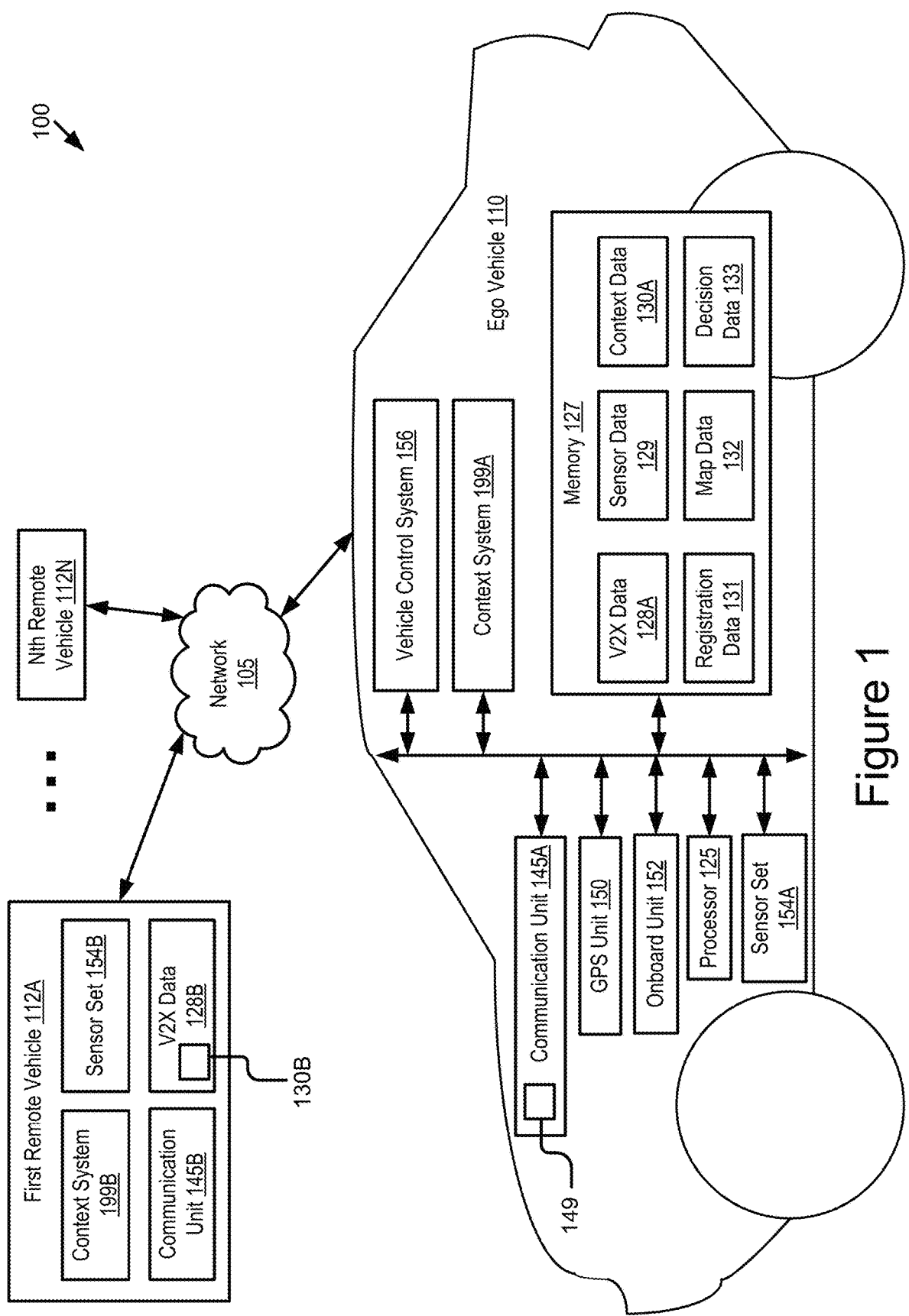
FIG. 1 is a block diagram illustrating an operating environment for a context system according to some embodiments.

V2X receivers are vulnerable to cyber-attacks. For example, V2X messages which are sent by malicious parties may provide false data to a V2X receiver. If an ADAS system or an autonomous driving system of the V2X receiver relies on the false data, it may be dangerous (or even life threatening) to a driver of the V2X receiver.

Examples of cyber-attacks may include a digital intrusion (e.g., Distributed Denial of Service (DDOS); hacking of a user system, a vehicle system, a communication system, etc.; virus; eavesdropping, etc.). Further examples of the cyber-attacks may include traffic attacking (e.g., fraud activities or fake vehicles on a roadway), etc. Examples of the traffic attacking include fake traffic information (e.g., fake vehicles, Sybil attacks, false accidents, false congestion, malicious invisibility, etc.) and a digital intrusion towards a communication network, etc.

Described herein are embodiments of a context system that is installed in a connected vehicle to provide cyber security against potential cyber-attacks. The context system is operable to provide the connected vehicle with the ability to identify and thwart the cyber-attacks. For example, the context system includes software installed in an ego vehicle that identifies when a V2X message includes false data or is otherwise sent by a malicious party based on a context of a V2X transmitter as reported by the V2X transmitter. The context system may compare the context of the V2X transmitter to data whose accuracy is known to be accurate in order to determine whether a cyber-attack event occurs.

Example improvements and advantages provided by the context system described herein are described here. For example, a V2X receiver installed with the context system may proactively identify whether any received V2X data is false or transmitted by a malicious party based on context data of a V2X transmitter. The context system does not trust V2X data provided by a V2X transmitter as being accurate until this data is verified using multiple sources of information. By comparison, existing solutions do not proactively identify such cyber-attacks and they generally trust the V2X data that they receive as being accurate. Other example improvements and advantages are also possible.

An example overview of the context system is provided here. The context system may be installed in an electronic control unit (ECU) of an ego vehicle. An entity which claims to be on a same roadway at the same time as the ego vehicle is referred to as a "remote vehicle." A remote vehicle may be an actual vehicle that is present on a roadway in the real world, or an object (e.g., a spoofed vehicle) whose presence is simulated by a malicious party. For example, a hacker may attempt to trick the ego vehicle into thinking that a remote vehicle is present at a particular location and taking particular actions, when in fact no remote vehicle is present at that location or taking those actions.

Any remote vehicles that are actually present on the roadway may cooperate with the ego vehicle to execute a registration process so that they are known to the ego vehicle. This process is referred to herein as a "cyber-physical registration process." Actual remote vehicles are V2X transmitters that broadcast or unicast V2X messages that include V2X data. The V2X data transmitted by a particular remote vehicle includes digital data that includes: (1) context data of the remote vehicle; and (2) registration data of the remote vehicle.

The context system described herein includes code and routines that are operable, when executed by a processor of the ego vehicle, to cause the processor to parse the V2X data included in a V2X message received from a purposed remote vehicle. The context system analyzes information described by the V2X data relative to multiple sources of information to proactively determine whether a cyber-attack event occurs. The cyber-attack event describes one or more of: the V2X data includes false data; the remote vehicle is actually not present in the roadway; and the V2X message is an element of a cyber-attack, etc.

The multiple sources of information include sensor data describing the ego vehicle's own sensor measurements (e.g., those of the environment and the remote vehicle). Alternatively, or additionally, the multiple sources of information include registration data describing stored registration information created during the cyber-physical registration process and map data describing a high-definition (HD) map of the roadway.

Then, the context system generates decision data. Decision data includes digital data that describes, based on the analysis described above, whether a cyber-attack event occurs. For example, the decision data describes whether the V2X data is false or whether the remote vehicle is actually present in the roadway. If the V2X data is false or the remote vehicle is not present in the roadway, then the context system also determines that the V2X message is an element of a cyber-attack and this determination is also described by the decision data.

If a cyber-attack event is detected, then the context system takes one or more remedial actions to mitigate the cyber-attack event. For example, the context system of the ego vehicle broadcasts an announcement of the cyber-attack event so that nearby remote vehicles know that the cyber-attack event is occurring. The context system is operable to proactively identify the presence of cyber-attacks. Then, V2X messages that include false data should not be relied on as accurate by the ADAS systems or autonomous driving systems of non-malicious connected vehicles.

As described herein, examples of V2X communications include Dedicated Short-Range Communication (DSRC) (including Basic Safety Messages (BSMs) and Personal Safety Messages (PSMs), among other types of DSRC communication). Further examples of V2X communications include: Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); or Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X message) described herein include, but are not limited to, the following messages: a DSRC message; a BSM message; and a LTE message. Further examples of a wireless message include one or more of the following: a LTE-V2X message (e.g., a LTE-V2V message, a LTE-V2I message, a LTE-V2N message, etc.); a 5G-V2X message; and a millimeter wave message, etc.

Example Overview

Referring to FIG. 1, depicted is an operating environment 100 for a context system 199 according to some embodiments. The operating environment 100 may include one or more of the following elements: an ego vehicle 110; and one or more remote vehicles 112 (e.g., a first remote vehicle 112A, . . . , an Nth remote vehicle 112N). These elements of the operating environment 100 may be communicatively coupled to a network 105. In practice, the operating environment 100 may include any number of ego vehicles 110, remote vehicles 112 and networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS) and multimedia messaging service (MMS). In some embodiments, the network 105 further includes networks for hypertext transfer protocol (HTTP), direct data connection, wireless application protocol (WAP), e-mail, DSRC, full-duplex wireless communication and mmWave. In some embodiments, the network 105 further includes networks for WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE, 5G-V2X or any other mobile data network or combination of mobile data networks. Further, the network 105 may include one or more IEEE 802.11 wireless networks.

The ego vehicle 110 may be any type of vehicle. For example, the ego vehicle 110 may include one of the following types of vehicles: a car; a truck; a sports utility vehicle; a bus; a semi-truck; a drone; or any other roadway-based conveyance. The ego vehicle 110 may be a connected vehicle that includes a communication unit and is capable of communicating with other endpoints connected to the network 105.

In some embodiments, the ego vehicle 110 is a DSRC-enabled vehicle which includes a DSRC radio and a DSRC-compliant Global Positioning System (GPS) unit. The ego vehicle 110 may also include other V2X radios besides a DSRC radio. DSRC is not a requirement of embodiments described herein, and any form of V2X communications is also feasible.

The ego vehicle 110 may include one or more of the following elements: a processor 125; a memory 127; a communication unit 145A; a GPS unit 150; an onboard unit 152; a sensor set 154A; a vehicle control system 156; and a context system 199A. These elements of the ego vehicle 110 may be communicatively coupled to one another via a bus.

In some embodiments, the processor 125 and the memory 127 may be elements of an onboard vehicle computer system (such as computer system 200 described below with reference to FIG. 2A). The onboard vehicle computer system may be operable to cause or control the operation of the context system 199A. The onboard vehicle computer system may be operable to access and execute the data stored on the memory 127 to provide the functionality described herein for the context system 199A or its elements (see, e.g., FIG. 2A).

The processor 125 includes an arithmetic logic unit, a microprocessor, a general-purpose controller, or some other processor array to perform computations and provide electronic display signals to a display device. The processor 125 processes data signals and may include various computing architectures. Example computing architectures include a complex instruction set computer (CISC) architecture, a reduced instruction set computer (RISC) architecture, or an architecture implementing a combination of instruction sets. The ego vehicle 110 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media. Example permanent storage devices include a hard disk drive, a floppy disk drive, a CD-ROM device, a DVD-ROM device, a DVD-RAM device, a DVD-RW device, and a flash memory device, etc. Additional example permanent storage devices may include some other mass storage device for storing information on a more permanent basis. The ego vehicle 110 may include one or more memories 127.

The memory 127 may store one or more of the following elements: V2X data 128A; sensor data 129; context data 130A; registration data 131; map data 132; and decision data 133.

The V2X data 128A may include digital data received from a remote vehicle 112 via a V2X message. For example, the V2X data 128A includes context data and registration data of the remote vehicle 112. In a further example, the V2X data 128A further includes remote sensor data generated by the remote vehicle 112. In some embodiments, the V2X data 128A includes digital data transmitted by the remote vehicle 112 via a V2X message.

Alternatively, or additionally, the V2X data 128A includes digital data that is broadcasted or unicasted by the ego vehicle 110 in a form of a V2X message. For example, the V2X data 128A includes context data and registration data of the ego vehicle 110. In a further example, the V2X data 128A further includes ego sensor data generated by the ego vehicle 110.

The sensor data 129 may describe information which is included in the V2X data 128A. The sensor data 129 may include one or more of: ego sensor data generated by the ego vehicle 110; remote sensor data generated by and received from the remote vehicle 112 via a V2X message; and any other sensor data generated by other endpoints (e.g., a roadside unit).

The ego sensor data may include digital data that describes one or more sensor measurements generated by the sensor set 154A of the ego vehicle 110. For example, the ego sensor data may include digital data that describes a speed and an acceleration (or a deceleration) of the ego vehicle 110. In another example, the ego sensor data may include digital data that describes a roadway environment including the remote vehicle 112 measured by one or more range finding and position locating sensors (such as LIDAR, radar, etc.) of the ego vehicle 110. In some embodiments, the ego sensor data is context-rich sensor data (which is described below in more detail).

The remote sensor data may include digital data that describes one or more sensor measurements generated by a sensor set 154B of the remote vehicle 112. The remote sensor data may include information similar to that of the ego sensor data. Similar description will not be repeated here. In some embodiments, the remote sensor data is context-rich sensor data.

The context data 130A may include digital data describing a context of a V2X transmitter of a V2X message. The V2X transmitter can be the ego vehicle 110, the remote vehicle 112 or any other endpoint connected to the network 105. For example, the context data 130A may include digital data that describes one or more of the following: a color of the V2X transmitter; an image of the V2X transmitter; an object prior to the V2X transmitter. Alternatively, or additionally, the context data 130A may include digital data that describes one or more of the following: a description of which lane the V2X transmitter is currently traveling in; and an image of a vehicle or an object which is to the left of the V2X transmitter. Alternatively, or additionally, the context data 130A may include digital data that describes one or more of the following: an image of the vehicle or an object that is to the right of the V2X transmitter; and a description of a license plate number of the V2X transmitter. Alternatively, or additionally, the context data 130A may include digital data that describes some other identifying information of the V2X transmitter.

The registration data 131 may include digital data that describes a unique identifier (ID) of the V2X transmitter (e.g., the remote vehicle 112 or the ego vehicle 110). For example, a unique ID of the remote vehicle 112 may be assigned to the remote vehicle 112 when it completes a cyber-physical registration process which is described below in more detail. The unique ID may be a cyber ID or a physical ID assigned to the remote vehicle 112.

The map data 132 may include digital data that describes a High-Definition (HD) map of a roadway environment where the ego vehicle 110 is present.

The decision data 133 may include digital data that describes whether a cyber-attack event occurs. If a cyber-attack event occurs, the decision data 133 may also include digital data describing information about the cyber-attack event (e.g., a time, a location and description of the cyber-attack event, etc.).

The communication unit 145A transmits and receives data to and from the network 105 or to another communication channel. In some embodiments, the communication unit 145A may include a DSRC transceiver, a DSRC receiver and other hardware or software necessary to make the ego vehicle 110 a DSRC-enabled device. For example, the communication unit 145A includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods. Example wireless communication methods may include one or more of the following: IEEE 802.11; and IEEE 802.16, BLUETOOTH®. Example wireless communication methods may further include EN ISO 14906:2004 Electronic Fee Collection—Application interface EN 11253:2004 DSRC—Physical layer using microwave at 5.8 GHz (review). Example wireless communication methods may further include EN 12795:2002 DSRC—DSRC Data link layer: Medium Access and Logical Link Control (review). Example wireless communication methods may further include EN 12834:2002 DSRC—Application layer (review) and EN 13372:2004 DSRC—DSRC profiles for RTTT applications (review). Example wireless communication methods may further include the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a cellular communications transceiver for sending and receiving data over a cellular communications network. For example, the data may be sent or received via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

The communication unit 145A may include a V2X radio 149. The V2X radio 149 may include a hardware element including a DSRC transmitter which is operable to transmit DSRC messages on the 5.9 GHz band. The 5.9 GHz band is reserved for DSRC messages. The hardware element may also include a DSRC receiver which is operable to receive DSRC messages on the 5.9 GHz band.

In some embodiments, the GPS unit 150 is a conventional GPS unit of the ego vehicle 110. For example, the GPS unit 150 may include hardware that wirelessly communicates with a GPS satellite to retrieve data that describes a geographic location of the ego vehicle 110. In some embodiments, the GPS unit 150 is a DSRC-compliant GPS unit of the ego vehicle 110. The DSRC-compliant GPS unit is operable to provide GPS data describing the geographic location of the ego vehicle 110 with lane-level accuracy.

The lane-level accuracy indicates that the geographic location of the ego vehicle 110 has an accuracy of plus or minus 1.5 meters of its actual location in the real-world. A lane of a roadway is about 3 meters wide. Thus, an accuracy of plus or minus 1.5 meters is sufficiently precise that it enables other endpoints which receive the location data (via DSRC messages) to know the exact lane of travel of each vehicle on the roadway. The location data can be GPS data that describes the geographic location and the time when the ego vehicle 110 is at this geographic location.

The onboard unit 152 can include one or more processors and one or more memories. The onboard unit 152 can include an ECU. The ECU may control an operation of the vehicle control system 156, the sensor set 154A and the context system 199A of the ego vehicle 110. In some embodiments, the context system 199A of the ego vehicle 110 is installed in the onboard unit 152.

The sensor set 154A includes one or more sensors that are operable to measure a roadway environment outside of the ego vehicle 110. For example, the sensor set 154A may include one or more sensors that record one or more physical characteristics of the roadway environment that is proximate to the ego vehicle 110. The memory 127 may store sensor data that describes the one or more physical characteristics recorded by the sensor set 154A.

In some embodiments, the sensor set 154A may include one or more of the following vehicle sensors: a camera; a LIDAR sensor; a radar sensor; a laser altimeter; an infrared detector; a motion detector; a thermostat; and a sound detector. The sensor set 154A may also include one or more of the following sensors: a carbon monoxide sensor; a carbon dioxide sensor; an oxygen sensor; a mass air flow sensor; and an engine coolant temperature sensor. The sensor set 154A may also include one or more of the following sensors: a throttle position sensor; a crank shaft position sensor; an automobile engine sensor; a valve timer; an air-fuel ratio meter; and a blind spot meter. The sensor set 154A may also include one or more of the following sensors: a curb feeler; a defect detector; a Hall effect sensor, a manifold absolute pressure sensor; a parking sensor; a radar gun; a speedometer; and a speed sensor. The sensor set 154A may also include one or more of the following sensors: a tire-pressure monitoring sensor; a torque sensor; a transmission fluid temperature sensor; and a turbine speed sensor (TSS); a variable reluctance sensor; and a vehicle speed sensor (VSS). The sensor set 154A may also include one or more of the following sensors: a water sensor; a wheel speed sensor; and any other type of automotive sensor.

The vehicle control system 156 may control an operation of the ego vehicle 110. For example, the vehicle control system 156 may provide some or all of the autonomous functionality for the ego vehicle 110. In some embodiments, the vehicle control system 156 may include one or more ADAS systems, an autonomous driving system or a combination thereof.

Examples of the ADAS systems included in the ego vehicle 110 include one or more of the following: an automatic cruise control (ACC) system; an adaptive high beam system; an adaptive light control system; and an automatic parking system. Further examples of the ADAS systems include: an automotive night vision system; a blind spot monitor; a collision avoidance system; a crosswind stabilization system; a driver drowsiness detection system; and a driver monitoring system. Further examples of the ADAS systems include: an emergency driver assistance system; a forward collision warning system; an intersection assistance system; an intelligent speed adaption system; a lane departure warning system (sometimes referred to as a lane keep assistant). Further examples of the ADAS systems include: a pedestrian protection system; a traffic sign recognition system; a turning assistant; and a wrong way driving warning system, etc. The features and functionality provided by these example ADAS systems are also referred to herein as an "autonomous feature" or an "autonomous functionality," respectively. In practice, the onboard systems include any vehicle feature having functionality which allows it to monitor and track the operational data and the route data, and not just ADAS systems.

The remote vehicle 112 present on a roadway may have a structure similar to that of the ego vehicle 110. Similar description will not be repeated here. The operating environment 100 may include multiple remote vehicles 112 (e.g., the first remote vehicle 112A, . . . , the Nth remote vehicle 112N). In some embodiments, the first remote vehicle 112A may include an instance of the context system (e.g., a context system 199B), a sensor set 154B and a communication unit 145B. The remote vehicle 112A may also store V2X data 128B in its local storage device. The remote vehicle 112N may have a structure similar to that of the remote vehicle 112A, and so, similar description will not be repeated here.

The sensor sets 154A and 154B may have a similar structure and provide similar functionality and may be referred to herein as "sensor set 154" individually or collectively. Similar description for the sensor set 154B will not be repeated here.

The communication units 145A and 145B may have a similar structure and provide similar functionality and may be referred to herein as "communication unit 145" individually or collectively. Similar description for the communication unit 145B will not be repeated here.

The V2X data 128B may include context data 130B. The V2X data 128A and the V2X data 128B may have similar content and may be referred to herein as "V2X data 128" individually or collectively. The context data 130A and the context data 130B may have similar content and may be referred to herein as "context data 130" individually or collectively. Similar description for the V2X data 128B and the context data 130B will not be repeated here.

The context systems 199A and 199B may have a similar structure and provide similar functionality and may be referred to herein as "context system 199" individually or collectively.

In some embodiments, the context system 199 includes software that is operable, when executed by the processor 125, to cause the processor 125 to execute one or more steps of a method 300 described below with reference to FIG. 3. In some embodiments, the context system 199 may be implemented using hardware including a field-programmable gate array ("FPGA") or an application-specific integrated circuit ("ASIC"). In some other embodiments, the context system 199 may be implemented using a combination of hardware and software. The context system 199 may be stored in a combination of the devices (e.g., servers or other devices), or in one of the devices.

An example that illustrates operations of the context system 199 is provided here. For example, the context system 199 of the remote vehicle 112 broadcasts a V2X message which is received by the ego vehicle 110. This V2X message includes V2X data. The V2X data describes information about the remote vehicle 112 which may be useful for the ego vehicle 110. For example, the ego vehicle 110 may be an autonomous vehicle that needs to track each of the other vehicles in its environment. When the ego vehicle 110 receives the V2X message, the context system 199 of the ego vehicle 110 parses the V2X data from the V2X message and determines whether it is false or otherwise an element of a cyber-attack event. If the V2X data is not false, then it is inputted to an ADAS system of the ego vehicle 110 so that the ADAS system can provide its functionality. If the V2X data is false, then the context system 199 of the ego vehicle 110 takes one or more remedial actions and does not provide the V2X data to the ADAS system of the ego vehicle 110.

The context system 199 is described below in more detail with reference to FIGS. 2A-4B.

Example Computer System

Figure 2A:
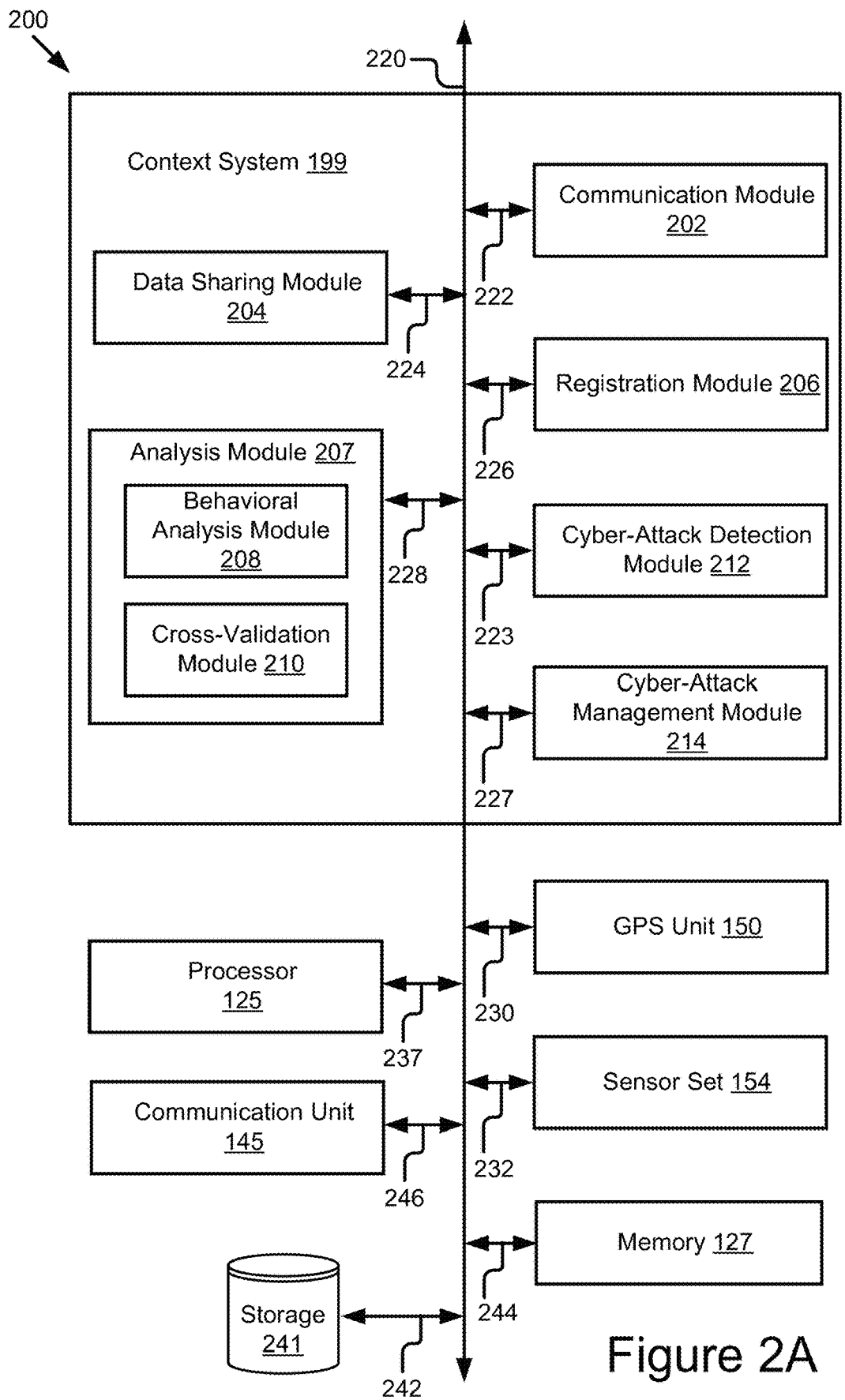
FIG. 2A is a block diagram illustrating an example computer system including the context system according to some embodiments.

Referring now to FIG. 2A, depicted is a block diagram illustrating an example computer system 200 including the context system 199 according to some embodiments. In some embodiments, the computer system 200 may include a special-purpose computer system that is programmed to perform one or more steps of the method 300 described below with reference to FIG. 3.

In some embodiments, the computer system 200 may be an element of the ego vehicle 110. In some embodiments, the computer system 200 may be an onboard vehicle computer of the ego vehicle 110. In some embodiments, the computer system 200 may include an engine control unit, head unit or some other processor-based computing device of the ego vehicle 110.

The computer system 200 may include one or more of the following elements according to some examples: the context system 199; the processor 125; and the communication unit 145. The computer system 200 may further include one or more of the following elements: the sensor set 154; the GPS unit 150; the memory 127; and a storage 241. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The sensor set 154 is communicatively coupled to the bus 220 via a signal line 232. The GPS unit 150 is communicatively coupled to the bus 220 via a signal line 230. The storage 241 is communicatively coupled to the bus 220 via a signal line 242. The memory 127 is communicatively coupled to the bus 220 via a signal line 244.

The following elements are described above with reference to FIG. 1: the processor 125; the communication unit 145; the sensor set 154; the GPS unit 150; and the memory 127. Those descriptions will not be repeated here.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media (e.g., a hard disk drive, a floppy disk drive, a flash memory device, etc.) for storing information on a more permanent basis.

In the illustrated embodiment shown in FIG. 2A, the context system 199 includes: a communication module 202; a data sharing module 204; and a registration module 206. The context system 199 further includes: an analysis module 207 (that includes a behavioral analysis module 208 and a cross-validation module 210); a cyber-attack detection module 212; and a cyber-attack management module 214. These components of the context system 199 are communicatively coupled to each other via the bus 220. In some embodiments, components of the context system 199 can be stored in a single server or device. In some other embodiments, components of the context system 199 can be distributed and stored across multiple servers or devices.

The communication module 202 can be software including routines for handling communications between the context system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, V2X data of the remote vehicle 112 or V2X data of the ego vehicle 110. The communication module 202 may send or receive any of the data or messages described above with reference to FIG. 1 via the communication unit 145.

In some embodiments, the communication module 202 receives data from the other components of the context system 199 and stores the data in one or more of the storage 241 and the memory 127. The other components of the context system 199 may cause the communication module 202 to communicate with the other elements of the computer system 200 or the operating environment 100 (via the communication unit 145). For example, the data sharing module 204 may use the communication module 202 to communicate with the sensor set 154 and cause the sensor set 154 to record sensor data.

The data sharing module 204 can be software including routines for sharing V2X data in a roadway environment of the ego vehicle 110. In some embodiments, the data sharing module 204 can be stored in the memory 127 of the computer system 200 and can be accessible and executable by the processor 125. The data sharing module 204 may be adapted for cooperation and communication with the processor 125 and other components of the computer system 200 via a signal line 224.

In some embodiments, the data sharing module 204 is operable to collect various sensor data. For example, the data sharing module 204 is operable to collect ego sensor data generated by onboard sensors of the ego vehicle 110. The ego sensor data may include vehicle information about the ego vehicle 110 itself such as a location, a speed and a heading of the ego vehicle 110, etc. The ego sensor data may also include digital data describing a surrounding environment of the ego vehicle 110 (e.g., sensor data generated by a camera, radar, LIDAR, etc.). In another example, the data sharing module 204 is operable to collect roadside sensor data received from one or more roadside sensors (e.g. Unmanned Aerial Vehicle (UAV), a high angle camera, a roadside LIDAR, etc.).

In some embodiments, the data sharing module 204 is operable to process the collected sensor data to identify a set of objects in the roadway environment and to generate fused sensor data accordingly. For example, the data sharing module 204 identifies one or more of remote vehicles 112 that travel on different lanes of the roadway, pedestrians on a sidewalk and curbs or walls on a roadside, etc., based on the collected sensor data. The data sharing module 204 may also identify a set of positions for the set of objects based on the collected sensor data. The data sharing module 204 generates the fused sensor data that includes the identified objects and their respective positions in the roadway environment.

In some embodiments, the data sharing module 204 is operable to generate context-rich sensor data based on the fused sensor data. For example, the data sharing module 204 enriches the fused sensor data with one or more of traffic information and profile information of the identified objects to generate the context-rich sensor data. The traffic information of the identified objects includes, for example, positions, speeds, headings, etc., of the objects. The profile information of the identified objects includes, for example, object types, unique IDs and colors, etc., of the objects. In this way, the context data that describes a context of the ego vehicle 110 is incorporated into the context-rich sensor data of the ego vehicle 110.

In some embodiments, the data sharing module 204 is operable to broadcast V2X data that includes the context-rich sensor data in a form of V2X communications. In some embodiments, the V2X data also includes registration data of the ego vehicle 110 that transmits the V2X data (here, by way of example the V2X transmitter is the ego vehicle 110). In this way, the ego vehicle 110 shares its V2X data with other endpoints (including the remote vehicle 112) in the roadway environment.

The registration module 206 can be software including routines for executing a cyber-physical registration process. In some embodiments, the registration module 206 can be stored in the memory 127 of the computer system 200 and can be accessible and executable by the processor 125. The registration module 206 may be adapted for cooperation and communication with the processor 125 and other components of the computer system 200 via a signal line 226.

In some embodiments, the registration module 206 locates a set of remote vehicles 112 in a roadway environment of the ego vehicle 110 based on one or more of: V2X data received from the set of remote vehicles 112; and ego sensor data. The registration module 206 may also locate the set of remote vehicles 112 further based on any other sensor data received from any other endpoints (e.g., a roadside unit). For example, the registration module 206 locates a remote vehicle 112 based on GPS data or any other sensor data reported by the remote vehicle 112 (this can be referred to as a self-reported positioning of the remote vehicle 112). In another example, the registration module 206 locates a remote vehicle 112 based on the ego sensor data (this can be referred to as a surrounding positioning of the remote vehicle 112 by the ego vehicle 110). In yet another example, the registration module 206 locates a remote vehicle 112 based on a cross-reference on: the GPS data or any other sensor data reported by the remote vehicle 112; the ego sensor data; and any other sensor data received from any other endpoints. This can be referred to as a cross positioning of the remote vehicle 112.

In some embodiments, the registration module 206 is operable to execute a cyber-physical registration process with the set of remote vehicles 112 that are located or identified within the roadway environment of the ego vehicle 110. For example, the registration module 206 exchanges a set of V2X messages with the set of remote vehicles 112 to verify existence of the set of remote vehicles 112 in the roadway environment. The registration module 206 generates a set of registration data for the set of remote vehicles at least by assigning a set of unique IDs to the set of remote vehicles 112 respectively. The set of unique IDs are described by the set of registration data, respectively. The set of unique IDs are known to the set of remote vehicles 112 respectively, as well as the ego vehicle 110.

In some embodiments, remote vehicles 112 that respond to the cyber-physical registration process are referred to as "responding" vehicles. This process also identifies "silent" vehicles that do not respond to the cyber-physical registration process so that their presence is still known and possibly confirmed among multiple other vehicles. Accordingly, this process includes a "sender identification" process for those remote vehicles 112 that respond to the ego vehicle 110 and a "silence identification" process for those remote vehicles 112 that do not respond to the ego vehicle 110.

A vehicle that appears in a V2X network can be referred as a cyber vehicle. For example, the cyber vehicle can be a responding vehicle. In another example, the cyber vehicle can be a connected vehicle that connects to the network 105. An actual vehicle that appears on a roadway can be considered as having a physical existence on the roadway. In some embodiments, a vehicle that has a physical existence on the roadway may be a responding vehicle or a silent vehicle. In the sender identification process, the registration module 206 identifies the physical existence of every cyber vehicle being reported in the V2X network and generates registration data for the respective cyber vehicle. In the silence identification process, the registration module 206 identifies the physical existence of one or more silent vehicles on the roadway that are not found in the V2X network and generates registration data for the one or more silent vehicles respectively. A reason why a vehicle keeps silence may be that the vehicle is an unconnected vehicle, or the vehicle is maliciously hidden itself from the V2X network.

In some embodiments, the registration module 206 generates map data describing a local traffic map based on information generated during the cyber-physical registration process for each identified vehicle. The local traffic map may show each registered or unregistered vehicle. For example, the local traffic map may illustrate each responding vehicle whose physical existence is identified. In another example, the local traffic map may also illustrate each silent vehicle whose physical existence is identified.

In some embodiments, the registration module 206 establishes a profile for each vehicle that the ego vehicle 110 identifies. For example, the registration module 206 generates a profile for each registered vehicle. In another example, the registration module 206 generates a profile for each unregistered vehicle that is physically present on the roadway. In yet another example, the registration module 206 generates a profile for each unregistered cyber vehicle. In some embodiments, a profile for a vehicle may include one or more of registration data of the vehicle, context data of the vehicle and any other profile data of the vehicle.

In some embodiments, V2X messages received by the ego vehicle 110 from the set of remote vehicles 112 during the cyber-physical registration process include V2X data that may or may not be false. The V2X data includes context data of the set of remote vehicles 112. Subsequent V2X messages may also be received from the set of remote vehicles 112. These subsequent V2X messages may also include respective registration data assigned to the set of remote vehicles 112 during the cyber-physical registration process.

The analysis module 207 can be software including routines for conducting an analysis on V2X data transmitted by a remote vehicle 112. In some embodiments, the analysis module 207 can be stored in the memory 127 of the computer system 200 and can be accessible and executable by the processor 125. The analysis module 207 may be adapted for cooperation and communication with the processor 125 and other components of the computer system 200 via a signal line 228.

In some embodiments, the analysis module 207 receives V2X data from the remote vehicle 112 via the communication unit 145. The V2X data includes one or more of remote sensor data, context data and registration data of the remote vehicle 112. The analysis module 207 analyzes the V2X data to determine one or more abnormal activities associated with the remote vehicle 112 based at least in part on the context data and the registration data of the remote vehicle 112.

In some embodiments, the one or more abnormal activities include one or more of an abnormal information reporting, an abnormal physical behavior and an abnormal cyber activity. An example of the abnormal information reporting includes malicious cyber information reporting (e.g., false accident reporting). Examples of the abnormal physical behavior include speeding and reckless driving, etc. Examples of the abnormal cyber activity include DDOS, hacking attempts and data probe attempts, etc. Other examples for the abnormal activities are also possible.

In some embodiments, the analysis module 207 includes one or more of the behavioral analysis module 208 and the cross-validation module 210. An analysis on the V2X data may include one or more of a behavioral analysis and a cross-validation analysis on the V2X data.

The behavioral analysis module 208 conducts a behavioral analysis on the V2X data to determine one or more abnormal activities associated with the remote vehicle 112 based at least in part on the context data and the registration data of the remote vehicle 112. In some embodiments, the behavioral analysis module 208 conducts the behavioral analysis on the V2X data further based on a first set of sensor data. The first set of sensor data includes one or more of remote sensor data received from the remote vehicle 112 and ego sensor data generated by the ego vehicle 110.

Specifically, the behavioral analysis module 208 conducts one or more of a motion dynamic analysis and a cyber-activity analysis based on one or more of the context data, the registration data of the remote vehicle 112 and the first set of sensor data. Then, the behavioral analysis module 208 generates a behavioral analysis result.

For example, the behavioral analysis module 208 performs a motion dynamic analysis to analyze motion activities of surrounding vehicles detected by onboard sensors of the ego vehicle 110. The surrounding vehicles may include the remote vehicle 112. The generated behavioral analysis result may include the motion activities of the surrounding vehicles.

In another example, the behavioral analysis module 208 performs a motion dynamic analysis to analyze motion activities of cyber vehicles reported in received V2X messages. The cyber vehicles may include the remote vehicle 112. The generated behavioral analysis result may then include the motion activities of the cyber vehicles.

In yet another example, the behavioral analysis module 208 performs a cyber-activity analysis to analyze cyber activities of the remote vehicle 112 such as service requesting, broadcasting messages, etc. The generated behavioral analysis result may then include the cyber activities of the remote vehicle 112.

Next, the behavioral analysis module 208 identifies one or more abnormal activities associated with the remote vehicle 112 based on the behavioral analysis result. For example, the behavioral analysis module 208 identifies any abnormal physical activity of the remote vehicle 112 (e.g., speeding, reckless driving, etc.) from the behavioral analysis result.

In another example, the behavioral analysis module 208 identifies any abnormal cyber activity (e.g., any malicious cyber activity) of the remote vehicle 112 from the behavioral analysis result. The abnormal cyber activity can be traffic related such as: the remote vehicle 112 being the only vehicle that reports a crash on the roadway; and the remote vehicle 112 reporting a congestion but its actual speed exceeding a certain threshold, etc. Alternatively, or additionally, the abnormal cyber activity can be service related such as: the remote vehicle 112 abnormally and frequently sending requests or messages; hacking attempts by the remote vehicle 112; DDOS, etc.

The behavioral analysis module 208 estimates a behavioral risk based on the one or more abnormal activities. For example, the behavioral analysis module 208 performs a behavioral risk management on the one or more abnormal activities to estimate a behavioral risk and generate a risk summary. The risk summary may include one or more of a potential risk probability, a risk type, a potential damage, and a risk level, etc. The risk summary may also include registration data of the remote vehicle 112 (e.g., a unique cyber ID of the remote vehicle 112 or a unique physical ID of the remote vehicle 112).

An example that illustrates operations of the behavioral analysis module 208 is provided here. In this example, the behavioral analysis module 208 analyzes the first set of sensor data, the context data of the remote vehicle 112, map data describing a local map and the registration data of the remote vehicle 112 to identify one or more abnormal activities. Specifically, the behavioral analysis module 208 identifies speeding, reckless driving and any other abnormal physical activity by the remote vehicle 112. Further, the behavioral analysis module 208 may monitor for instances where the remote vehicle 112 is the only one to report abnormal physical activities (and thus more likely to be reporting malicious information). In addition, the behavioral analysis module 208 may monitor for instances where the remote vehicle 112 makes abnormal or frequent requests (and thus more likely to be a malicious hacking or execute a denial of service attack or some other cyber-attack). In this way, the behavioral analysis module 208 identifies the abnormal activities associated with the remote vehicle 112.

The cross-validation module 210 conducts a cross-validation analysis on the V2X data of the remote vehicle 112 to determine one or more abnormal activities based at least in part on the context data and the registration data of the remote vehicle 112. The cross-validation module 210 may conduct the cross-validation analysis on the V2X data further based on a second set of sensor data. The second set of sensor data includes one or more of remote sensor data received from the remote vehicle 112, ego sensor data generated by the ego vehicle 110 and other sensor data received from one or more other endpoints.

Specifically, the cross-validation module 210 performs one or more of a cross-validation for traffic-related information and a cross-validation for service-related information based on a data cross-comparison of various sets of data. For example, the data cross-comparison is performed based on one or more of the context data of the remote vehicle 112, the registration data of the remote vehicle 112 and any sensor data from the second set of sensor data. Then, the cross-validation module 210 generates a cross-validation result. Next, the cross-validation module 210 identifies one or more abnormal activities associated with the remote vehicle 112 based on the cross-validation result.

For example, the cross-validation module 210 performs the cross-validation for traffic-related information (e.g., malicious traffic-related information) by cross-validating cyber activities, physical activities or behaviors, or a combination thereof of the remote vehicle 112. This cross-validation can be performed by cross-comparing a profile and the remote sensor data of the remote vehicle 112 with the ego sensor data and the other sensor data from other endpoints. The profile of the remote vehicle 112 may include the registration data, the context data and any other profile data of the remote vehicle 112. The cross-validation module 210 may generate a cross-validation result that includes the malicious traffic-related information. Then, the cross-validation module 210 may detect malicious cyber information (e.g., Sybil, masquerading, malicious alias, false accident reporting, cyber ghosting, etc.) based on the cross-validation result. Also, the cross-validation module 210 may detect malicious physical behaviors of the remote vehicle 112. For example, although the remote vehicle 112 reports itself with normal driving behaviors, but it is actually in a state of reckless driving, speeding, etc., and this can be detected by the cross-validation analysis executed by the cross-validation module 210. Further, the cross-validation module 210 may also track a source of the malicious traffic-related information.

In another example, the cross-validation module 210 performs the cross-validation for service-related information by cross-validating the cyber activities, physical activities or behaviors, or a combination thereof of the remote vehicle 112. This cross-validation can also be performed by cross-comparing the profile and the remote sensor data of the remote vehicle 112 with the ego sensor data and the other sensor data from other endpoints. The cross-validation module 210 may generate a cross-validation result that includes the cross-validated service-related information. Then, the cross-validation module 210 detects one or more abnormal cyber activities (e.g. DDOS, hacking attempts, data probe attempts, etc.) based on the cross-validation result. The cross-validation module 210 may also track a source of the abnormal cyber activities.

In some embodiments, the cross-validation module 210 generates one or more abnormality features for the one or more abnormal activities associated with the remote vehicle 112. For example, an abnormality feature for an abnormal activity may include an abnormal data feature describing one or more of an abnormality type of the abnormal activity, a probability of the abnormal activity, and a consequence of the abnormal activity, etc. The abnormality feature for the abnormal activity may also include sensor manifestation of the abnormal activity. Further, the abnormality feature for the abnormal activity may also include a source of the abnormal activity (e.g., a source of a possible intrusion).

An example that illustrates operations of the cross-validation module 210 is provided here. In this example, the cross-validation module 210 cross-validates V2X data received from the remote vehicle 112 by comparison to other V2X data received from other remote vehicles 112 and ego sensor data recorded by the ego vehicle 110 itself. The cross-validation module 210 detects any abnormal activities from the comparison. The abnormal activity detection includes, for example, an identification of malicious cyber information (e.g., Sybil, masquerading, malicious alias, false accident reporting, or cyber ghosting). The abnormal activity detection may also include, for example, an identification of a malicious physical behavior (e.g., a behavior reported as normal but actually reckless such as speeding, etc.). The abnormal activity detection may also include an identification of a source of malicious traffic-related information being tracked over time.

In this example, the cross-validation module 210 may also attempt to validate any service-related information received in the V2X data. This includes (1) a detection of abnormal cyber activities by the cross-validation module 210 (e.g., DDOS, hacking attempts, data probe attempts, etc.) and (2) source tracking (e.g., tracking a physical source of an abnormal cyber activity).

The cyber-attack detection module 212 can be software including routines for detecting an occurrence of a cyber-attack event. In some embodiments, the cyber-attack detection module 212 can be stored in the memory 127 of the computer system 200 and can be accessible and executable by the processor 125. The cyber-attack detection module 212 may be adapted for cooperation and communication with the processor 125 and other components of the computer system 200 via a signal line 223.

In some embodiments, the cyber-attack detection module 212 is operable to provide definitions for various types of cyber-attack events. For example, the cyber-attack detection module 212 defines possible types of cyber-attack events and cyber-attack features of the cyber-attack events. Examples of cyber-attack features for a cyber-attack event include possible attackers of the cyber-attack event and outcomes of the cyber-attack event, etc. Further examples of the cyber-attack features for the cyber-attack event include a profile of sensor data features and sensor data manifestation that can be used to facilitate the identification of the cyber-attack event.

In some embodiments, the cyber-attack detection module 212 is operable to determine whether a cyber-attack event occurs based on the one or more abnormal activities associated with the remote vehicle 112. For example, the cyber-attack detection module 212 matches the one or more abnormal activities to one or more cyber-attack features and detects the occurrence of the cyber-attack event based on the one or more cyber-attack features. If no cyber-attack feature is matched to the one or more abnormal activities, the cyber-attack detection module 212 may determine that no cyber-attack event occurs.

In some embodiments, the cyber-attack detection module 212 may also predict possible future cyber-attack events based on the one or more abnormal activities. For example, even if no cyber-attack feature is matched to the one or more abnormal activities, the cyber-attack detection module 212 may predict that a possible future cyber-attack event may occur if the one or more abnormal activities do not terminate.

In some embodiments, the cyber-attack detection module 212 updates cyber-attack features in a feature definition of the cyber-attack event to aid in future detection and prediction of the cyber-attack event.

In some embodiments, the cyber-attack detection module 212 estimates a potential cyber-attack risk for the cyber-attack event based on one or more of the V2X data of the remote vehicle 112, the ego sensor data and any other sensor data from other endpoints.

The cyber-attack management module 214 can be software including routines for managing a cyber-attack event. In some embodiments, the cyber-attack management module 214 can be stored in the memory 127 of the computer system 200 and can be accessible and executable by the processor 125. The cyber-attack management module 214 may be adapted for cooperation and communication with the processor 125 and other components of the computer system 200 via a signal line 227.

In some embodiments, responsive to detecting the occurrence of the cyber-attack event, the cyber-attack management module 214 modifies an operation of the vehicle control system 156 of the ego vehicle 110 to take remedial actions to mitigate the cyber-attack event. For example, the cyber-attack management module 214 causes the vehicle control system 156 of the ego vehicle 110 to discard the V2X data from the remote vehicle 112 so that the vehicle control system 156 is not affected by the cyber-attack event.

In some embodiments, the cyber-attack management module 214 broadcasts V2X messages describing any false V2X data it identifies or malicious parties it identifies. The cyber-attack management module 214 also does not input this false V2X data to any of its ADAS systems or autonomous driving system.

In some embodiments, the cyber-attack management module 214 conducts one or more of a traffic-attack risk estimation and a service-attack risk estimation based on the occurrence of the cyber-attack event. The cyber-attack management module 214 may summarize one or more risk features for the traffic-attack risk and the service-attack risk.

The cyber-attack management module 214 may provide a risk alert with the summarized risk features.

In some embodiments, the cyber-attack management module 214 may identify an attacker of the detected cyber-attack event, and track the attacker by one or more of a cyber ID of the attacker, a physical ID of the attacker and context data of the attacker, etc.

In some embodiments, the cyber-attack management module 214 may provide a reputation management for the remote vehicle 112. For example, the cyber-attack management module 214 may provide a risk reputation management for the remote vehicle 112 and track a risk reputation of the remote vehicle 112. In another example, the cyber-attack management module 214 scores the risk reputation for the remote vehicle 112, and credits and tracks the risk reputation in a block-chain system.

Figure 2B:
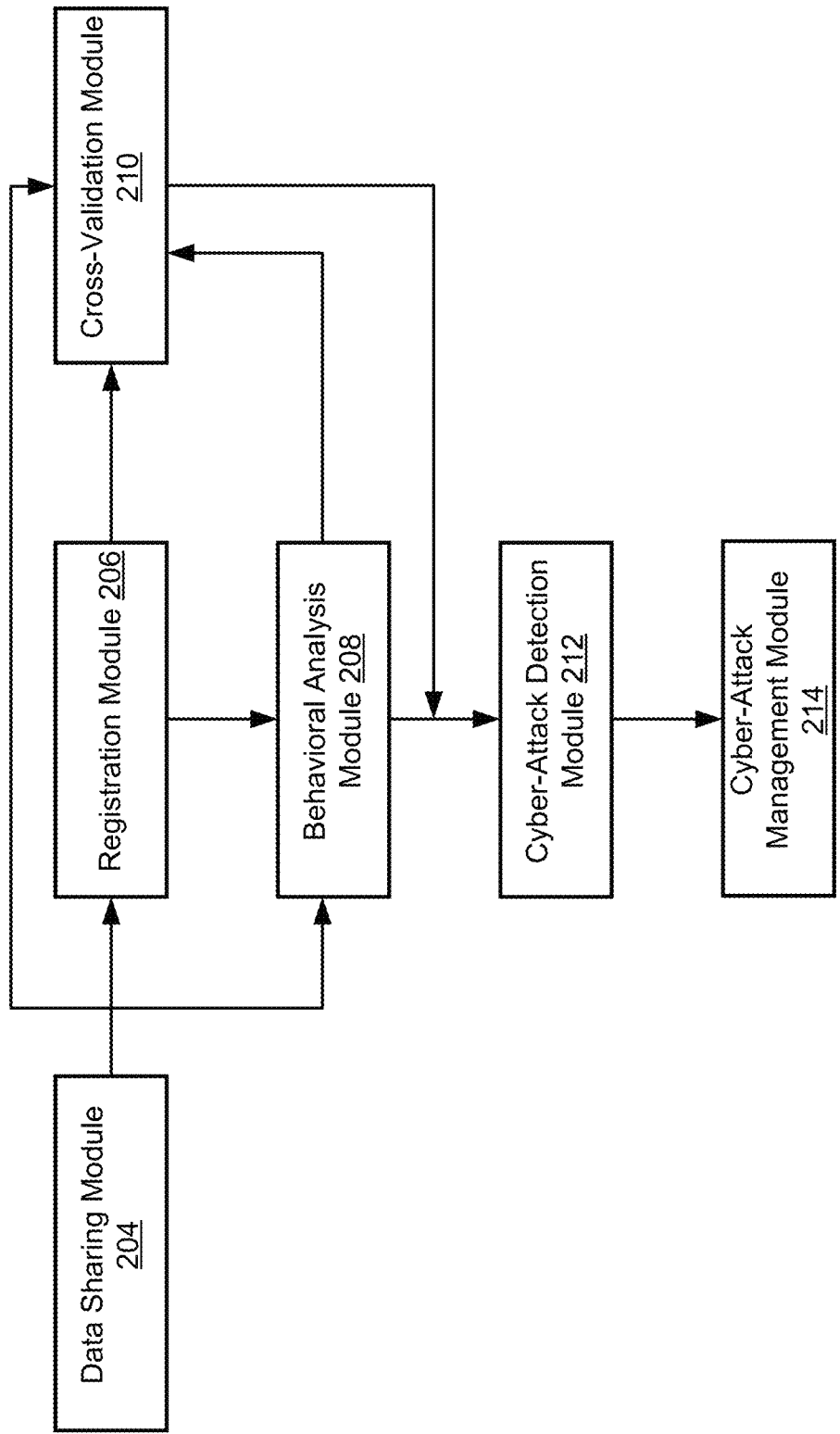
FIG. 2B is a block diagram illustrating an example data flow among components of the context system according to some embodiments.

Referring to FIG. 2B, an example data flow among the components of the context system 199 is illustrated. In some embodiments, the data sharing module 204 may send the generated context-rich sensor data to one or more of the registration module 206, the behavioral analysis module 208 and the cross-validation module 210. The registration module 206 may send the registration data to one or more of the behavioral analysis module 208 and the cross-validation module 210.

The behavioral analysis module 208 may send data describing one or more determined abnormal activities to the cyber-attack detection module 212. Additionally, or alternatively, the cross-validation module 210 may send data describing one or more determined abnormal activities to the cyber-attack detection module 212. After detecting an occurrence of a cyber-attack event, the cyber-attack detection module 212 may send decision data describing the cyber-attack event to the cyber-attack management module 214. Other data flow among the components of the context system 199 is also possible, which is not described here.

Example Processes

Figure 3:
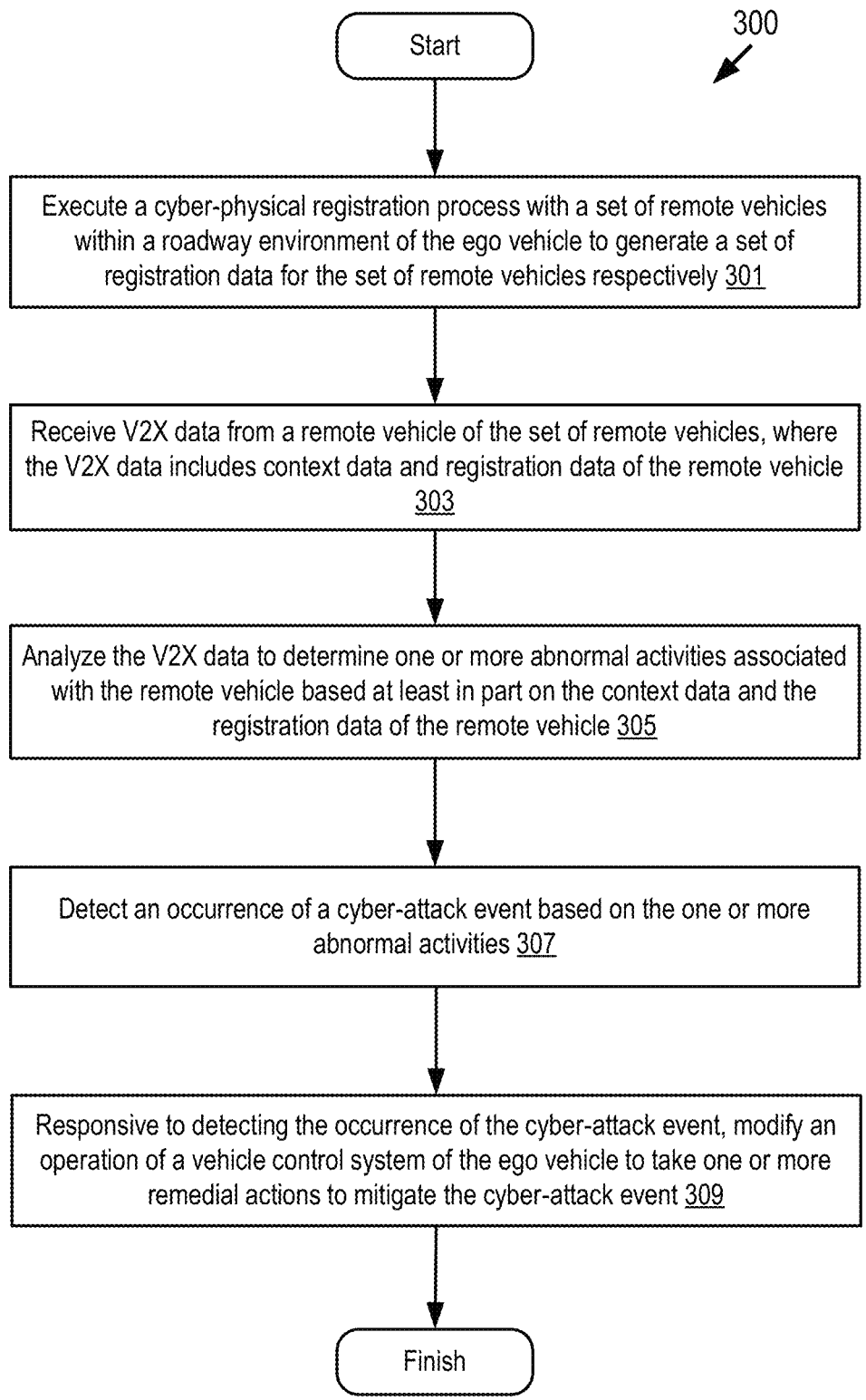
FIG. 3 depicts a method for providing cyber security to a connected vehicle according to some embodiments.

Referring now to FIG. 3, depicted is a flowchart of an example method 300 for providing cyber security to the ego vehicle 110 according to some embodiments. The steps of the method 300 are executable in any order, and not necessarily the order depicted in FIG. 3.

At step 301, the registration module 206 executes a cyber-physical registration process with a set of remote vehicles 112 within a roadway environment of the ego vehicle 110 to generate a set of registration data for the set of remote vehicles 112 respectively.

At step 303, the analysis module 207 receives V2X data from a remote vehicle 112 of the set of remote vehicles 112, where the V2X data includes context data and registration data of the remote vehicle 112. In some embodiments, the analysis module 207 receives V2X data transmitted by the remote vehicle 112 of the set of remote vehicles 112.

At step 305, the analysis module 207 analyzes the V2X data to determine one or more abnormal activities associated with the remote vehicle 112 based at least in part on the context data and the registration data of the remote vehicle 112.

At step 307, the cyber-attack detection module 212 detects an occurrence of a cyber-attack event based on the one or more abnormal activities.

At step 309, responsive to detecting the occurrence of the cyber-attack event, the cyber-attack management module 214 modifies an operation of the vehicle control system 156 of the ego vehicle 110 to take one or more remedial actions to mitigate the cyber-attack event.

Figure 4A:
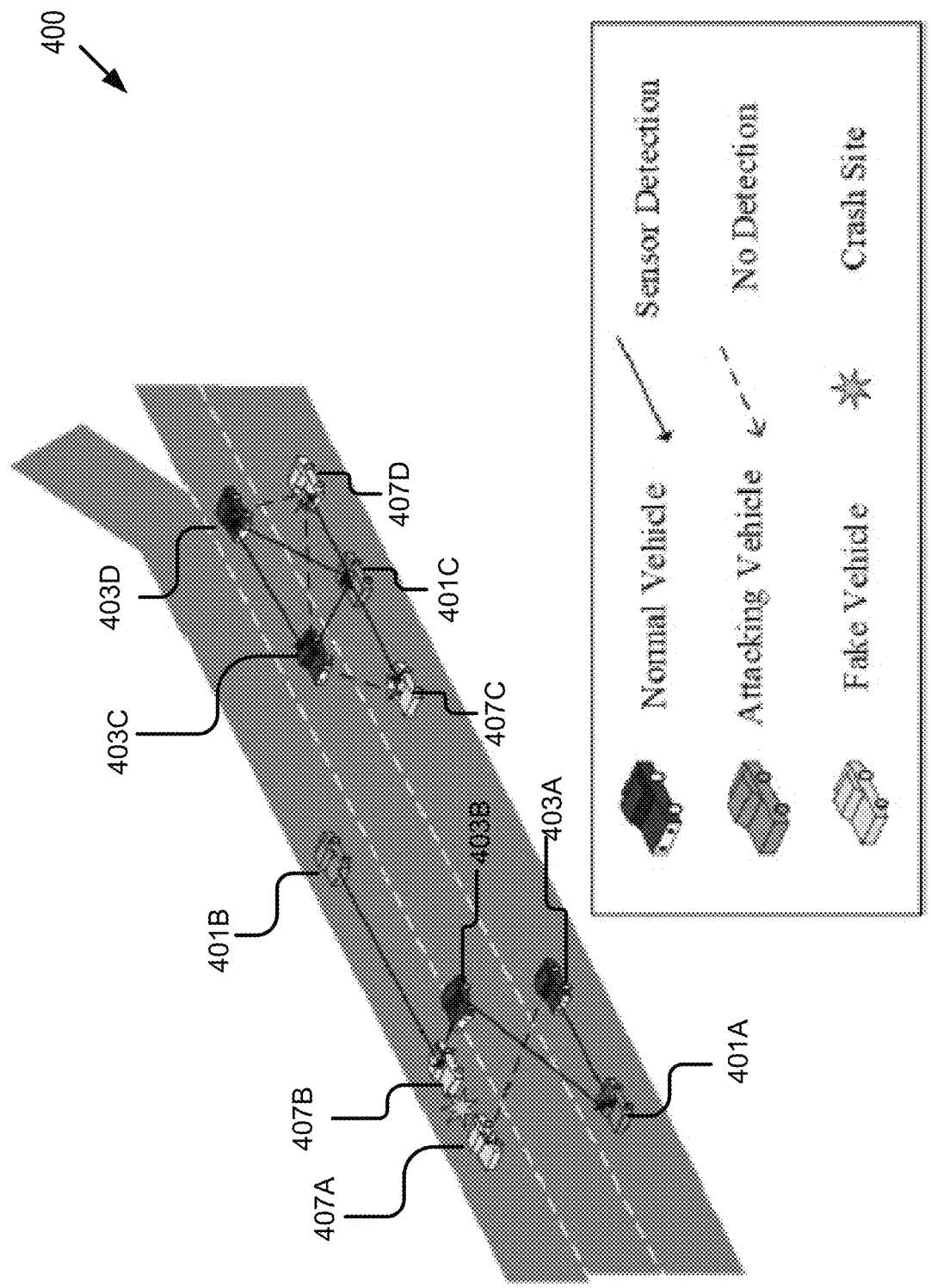
FIG. 4A is a graphical representation illustrating an example roadway environment with cyber-attack events according to some embodiments.

FIG. 4A is a graphical representation illustrating an example roadway environment 400 with cyber-attack events according to some embodiments. By way of example, illustrated are 4 normal vehicles 403A-403D, 3 attacking vehicles 401A-401C and 4 fake vehicles 407A-407D in the roadway environment 400. The attacking vehicles 401A-401C can be malicious vehicles physically present on the roadway. The fake vehicles 407A-407D are fake vehicles such that a malicious party attempts to trick the normal vehicles 403A-403D into thinking that the fake vehicles are present in the environment (but in fact they are not).

A crash site is faked between the fake vehicles 407A and 407B by the attacking vehicle 401B such that the attacking vehicle 401B broadcasts a V2X message describing a detection of the crash site between the vehicles 407A and 407B on a particular location. However, because the crash site is false, the normal vehicles 403A and 403B which are nearby the reported location of the crash site do not detect the presence of the vehicles 407A and 407B as well as the crash site. By cross-validating the detection of the attacking vehicle 401B with the detection of the normal vehicles 403A and 403B, the context systems 199 of the normal vehicles 403A and 403B can determine that the vehicles 407A and 407B as well as the crash site do not exist. Thus, the context systems 199 of the normal vehicles 403A and 403B can determine that the vehicles 407A and 407B are fake vehicles.

Further, the attacking vehicle 401C may broadcast a V2X message describing the presence of the vehicles 407C and 407D on the roadway. However, the normal vehicles 403C and 403D which are nearby the attacking vehicle 401C do not detect the presence of the vehicles 407C and 407D on the roadway. By cross-validating the detection of the attacking vehicle 401C with the detection of the normal vehicles 403C and 403D, the context systems 199 of the normal vehicles 403C and 403D can determine that the vehicles 407C and 407D do not exist. Thus, the context systems 199 of the normal vehicles 403C and 403D can determine that the vehicles 407C and 407D are fake vehicles.

Figure 4B:
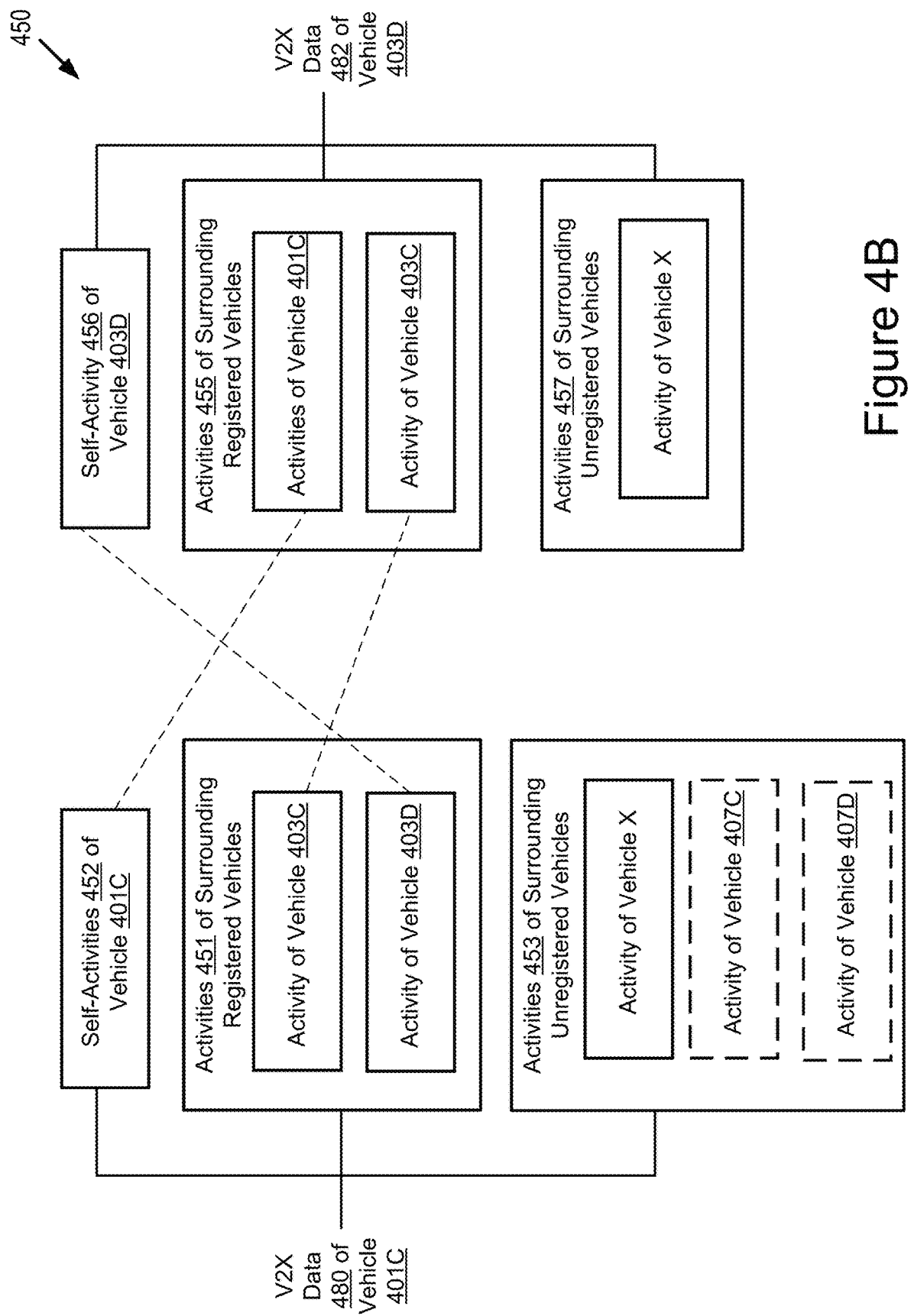
FIG. 4B is a graphical representation illustrating an example cross-validation analysis for determining one or more abnormal activities according to some embodiments.

FIG. 4B is a graphical representation illustrating an example cross-validation analysis 450 for determining one or more abnormal activities according to some embodiments. FIG. 4B is described with reference to the roadway environment 400 shown in FIG. 4A (e.g., the vehicle 401C, the vehicle 403D and the vehicle 403A in FIG. 4A).

By way of example, assume that V2X data 480 broadcasted by the vehicle 401C (which is an attacking vehicle) includes first context-rich sensor data of the vehicle 401C. The first context-rich sensor data describes one or more self-activities 452 of the vehicle 401C and one or more activities 451 of surrounding registered vehicles detected by the vehicle 401C. The first context-rich sensor data also describes one or more activities 453 of surrounding unregistered vehicles detected by the vehicle 401C.

The one or more activities 451 of surrounding registered vehicles include an activity of the vehicle 403C and an activity of the vehicle 403D detected by the vehicle 401C. The one or more activities 453 of surrounding unregistered vehicles include an activity of a vehicle X, an activity of the vehicle 407C and an activity of the vehicle 407D detected by the vehicle 401C.

V2X data 482 broadcasted by the vehicle 403D (which is a normal vehicle) includes second context-rich sensor data of the vehicle 403D. The second context-rich sensor data describes a self-activity 456 of the vehicle 403D and one or more activities 455 of surrounding registered vehicles detected by the vehicle 403D. The second context-rich sensor data also describes one or more activities 457 of surrounding unregistered vehicles detected by the vehicle 403D.

The one or more activities 455 of surrounding registered vehicles include one or more activities of the vehicle 401C and an activity of the vehicle 403C detected by the vehicle 403D. The one or more activities 457 of surrounding unregistered vehicles include an activity of the vehicle X.

Assume that the vehicle 403A is an example of the ego vehicle 110 that receives both (1) the V2X data 480 of the vehicle 401C and (2) the V2X data 482 of the vehicle 403D. The vehicle 401C is in the vicinity of the vehicle 403D as shown in FIG. 4A. The cross-validation module 210 of the vehicle 403A cross-validates (1) the V2X data 480 of the vehicle 401C with (2) the V2X data 482 of the vehicle 403D and finds multiple conflicts between the V2X data 480 and the V2X data 482. The conflicts are illustrated with dashed lines or dashed boxes in FIG. 4B.

For example, a first conflict exists between the activity of the vehicle 403D detected by the vehicle 401C and the self-activity of the vehicle 403D reported by the vehicle 403D itself. A second conflict exists between the self-activities of the vehicle 401C reported by the vehicle 401C itself and the activities of the vehicles 401C detected by the vehicle 403D. A third conflict exits between the activity of the vehicle 403C detected by the vehicle 401C and the activity of the vehicle 403C detected by the vehicle 403D.

A fourth conflict exists between the activities 453 of surrounding unregistered vehicles detected by the vehicle 401C and the activities 457 of surrounding unregistered vehicles detected by the vehicle 403D. This is because the vehicle 403D does not detect the vehicles 407C and 407D on the roadway as well as any activity of them.

Here, an activity reported in the V2X data 480 or 482 can include a motion dynamics analysis, one or more driving events, one or more cyber activities, one or more driving behaviors, sensor data or any other information. A conflict between two activities can include one or more of a speed conflict, a location identification conflict, an event description conflict, or any other conflict.

Assume that the vehicle 403D is known to be a normal and reliable vehicle. Then, based on the multiple conflicts, the cross-validation module 210 of the vehicle 403A determines that the V2X data 480 from the vehicle 401C includes false data. The vehicle 401C can be a malicious party on the roadway. The cross-validation module 210 of the vehicle 403A can label the vehicle 401C with at least an abnormal activity of reporting false V2X data.

FIGS. 5A-5B are graphical representations illustrating example V2X data according to some embodiments. Vehicles are increasingly equipped with DSRC. DSRC-equipped vehicles broadcast BSM messages at an adjustable rate of once every 0.10 seconds. These BSM messages include BSM data, which is a type of V2X data. FIG. 5A illustrates some of the V2X data that is included in each BSM message.

FIG. 5B depicts two parts of the DSRC message. Part 1 of the DSRC message includes core data elements, including a vehicle position, a heading, a speed, an acceleration, a steering wheel angle, and a vehicle size, etc. The DSRC message is transmitted at an adjustable rate of about 10 times per second. Part 2 of the DSRC message includes a variable set of data elements drawn from an extensive list of optional elements. Some of them are selected based on event triggers, e.g., ABS activated. They are added to Part 1 and sent as part of the DSRC message, but many are transmitted less frequently in order to conserve bandwidth. The DSRC message includes only current snapshots (with the exception of path data which is itself limited to a few second's worth of past history data).

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product comprising a non-transitory memory of an onboard vehicle computer system of an ego vehicle storing computer-executable code that, when executed by a processor, causes the processor to:
   receive Vehicle-to-Everything (V2X) data transmitted by a remote vehicle, wherein the V2X data includes context data and registration data of the remote vehicle;
   analyze the V2X data to determine that the remote vehicle does not exist in a roadway environment based at least in part on the context data and the registration data of the remote vehicle;
   detect an occurrence of a cyber-attack event based on the remote vehicle failing to exist in the roadway environment; and
   responsive to detecting the occurrence of the cyber-attack event, modify an operation of a vehicle control system of the ego vehicle to take one or more remedial actions to mitigate the cyber-attack event.

2. The computer program product of claim 1, wherein the remote vehicle is part of a set of remote vehicles and the computer-executable code is further operable to cause the processor to execute a cyber-physical registration process with the set of remote vehicles at least by:
   exchanging a set of V2X messages with the set of remote vehicles to verify existence of remote vehicles in the roadway environment; and
   assigning a unique identifier to each of the remote vehicles in the set of remote vehicles, wherein the registration data describes the unique identifier of the remote vehicles;
   wherein the remote vehicle is a cyber vehicle that connects to a V2X network but is not physically present in the roadway environment.

3. The computer program product of claim 2, wherein the computer-executable code is further operable to generate map data describing a local traffic map that includes the unique identifier for each of the remote vehicles in the set of remote vehicles.

4. The computer program product of claim 1, wherein analyzing the V2X data to determine that the remote vehicle fails to exist in the roadway environment comprises:
   conducting a cross-validation analysis on the V2X data to determine that the remote vehicle fails to exist in the roadway environment based on cross-validating traffic-related information and service-related information with the context data and the registration data of the remote vehicle.

5. A method for an ego vehicle, comprising:
   receiving Vehicle-to-Everything (V2X) data transmitted by a remote vehicle, wherein the V2X data includes context data and registration data of the remote vehicle;

analyzing the V2X data to determine that the remote vehicle does not exist in a roadway environment based at least in part on the context data and the registration data of the remote vehicle;
detecting an occurrence of a cyber-attack event based on the remote vehicle failing to exist in the roadway environment; and
responsive to detecting the occurrence of the cyber-attack event, modifying an operation of a vehicle control system of the ego vehicle to take one or more remedial actions to mitigate the cyber-attack event.

6. The method of claim 5, further comprising:
identifying a physical existence of a silent vehicle in the roadway environment that is not connected to a V2X network; and
generating registration data for the silent vehicle.

7. The method of claim 5, further comprising executing a cyber-physical registration process with a set of remote vehicles to generate a set of registration data for the set of remote vehicles at least by:
exchanging a set of V2X messages with the set of remote vehicles to verify existence of the set of remote vehicles in the roadway environment, wherein the set of remote vehicles includes the remote vehicle and the set of registration data includes the registration data of the remote vehicle; and
assigning a set of unique identifiers to the set of remote vehicles, wherein the set of registration data describes the set of unique identifiers for the set of remote vehicles respectively.

8. The method of claim 5, wherein analyzing the V2X data to determine that the remote vehicle fails to exist in the roadway environment comprises:
conducting a behavioral analysis on the V2X data to determine that the remote vehicle fails to exist in the roadway environment based on one or more of the context data of the remote vehicle, the registration data of the remote vehicle or a first set of sensor data,
wherein the first set of sensor data includes one or more of remote sensor data received from the remote vehicle or ego sensor data generated by the ego vehicle.

9. The method of claim 8, wherein conducting the behavioral analysis on the V2X data to determine that the remote vehicle does not exist in the roadway environment further includes:
conducting one or more of a motion dynamic analysis or a cyber-activity analysis to generate a behavioral analysis result based on the one or more of the context data of the remote vehicle, the registration data of the remote vehicle or the first set of sensor data;
identifying that the remote vehicle does not exist in the roadway environment based on the behavioral analysis result; and
estimating a behavioral risk based on the identification that the remote vehicle does not exist in the roadway environment.

10. The method of claim 5, wherein analyzing the V2X data to determine that the remote vehicle does not exist in the roadway environment comprises:
conducting a cross-validation analysis on the V2X data to determine that the remote vehicle does not exist in the roadway environment is further based on one or more of the context data of the remote vehicle, the registration data of the remote vehicle or a second set of sensor data,
wherein the second set of sensor data includes one or more of remote sensor data received from the remote vehicle, ego sensor data generated by the ego vehicle or other sensor data received from one or more other endpoints.

11. The method of claim 10, wherein conducting the cross-validation analysis on the V2X data to determine that the remote vehicle does not exist in the roadway environment further includes:
performing one or more of a cross-validation for traffic-related information or a cross-validation for service-related information to generate a cross-validation result based on a data cross-comparison of the one or more of the context data of the remote vehicle, the registration data of the remote vehicle or the second set of sensor data;
identifying that the remote vehicle does not exist in the roadway environment based on the cross-validation result; and
generating one or more abnormality features based on identifying that the remote vehicle does not exist in the roadway environment.

12. The method of claim 5, wherein the method further comprises:
exchanging a set of V2X messages with a set of remote vehicles to verify existence of remote vehicles in the roadway environment;
assigning a unique identifier to each of the remote vehicles in the set of remote vehicles; and
generating map data describing a local traffic map that includes the unique identifier for each of the remote vehicles in the set of remote vehicles.

13. The method of claim 5, wherein detecting the occurrence of the cyber-attack event based on the remote vehicle failing to exist in the roadway environment comprises:
matching one or more abnormal activities to one or more cyber-attack features; and
detecting the occurrence of the cyber-attack event based on the one or more cyber-attack features.

14. A system comprising:
an onboard vehicle computer system of an ego vehicle including a non-transitory memory storing computer code which, when executed by the onboard vehicle computer system, causes the onboard vehicle computer system to:
receive Vehicle-to-Everything (V2X) data transmitted by a remote vehicle, wherein the V2X data includes context data and registration data of the remote vehicle;
analyze the V2X data to determine that the remote vehicle does not exist in a roadway environment based at least in part on the context data and the registration data of the remote vehicle;
detect an occurrence of a cyber-attack event based on the remote vehicle failing to exist in the roadway environment; and
responsive to detecting the occurrence of the cyber-attack event, modify an operation of a vehicle control system of the ego vehicle to take one or more remedial actions to mitigate the cyber-attack event.

15. The system of claim 14, wherein the computer code, when executed by the onboard vehicle computer system, causes the onboard vehicle computer system further to:
identify a physical existence of a silent vehicle in the roadway environment that is not connected to a V2X network; and
generate registration data for the silent vehicle.

16. The system of claim 14, wherein the computer code, when executed by the onboard vehicle computer system, causes the onboard vehicle computer system to execute a cyber-physical registration process with a set of remote vehicles to generate a set of registration data for the set of remote vehicles at least by:

exchanging a set of V2X messages with the set of remote vehicles to verify existence of the set of remote vehicles in the roadway environment, wherein the set of remote vehicles includes the remote vehicle and the set of registration data includes the registration data of the remote vehicle; and assigning a set of unique identifiers to the set of remote vehicles, wherein the set of registration data describes the set of unique identifiers for the set of remote vehicles respectively.

17. The system of claim 14, wherein the computer code, wherein analyzing the V2X data to determine that the remote vehicle does not exist in the roadway environment comprises:

conducting a behavioral analysis on the V2X data to determine that the remote vehicle does not exist in the roadway environment based on one or more of the context data of the remote vehicle, the registration data of the remote vehicle or a first set of sensor data, wherein the first set of sensor data includes one or more of remote sensor data received from the remote vehicle and ego sensor data generated by the ego vehicle.

18. The system of claim 17, wherein the computer code, when executed by the onboard vehicle computer system, causes the onboard vehicle computer system to conduct the behavioral analysis on the V2X data to determine that the remote vehicle does not exist in the roadway environment at least by:

conducting one or more of a motion dynamic analysis or a cyber-activity analysis to generate a behavioral analysis result based on the one or more of the context data of the remote vehicle, the registration data of the remote vehicle or the first set of sensor data;

identifying that the remote vehicle does not exist in the roadway environment based on the behavioral analysis result; and estimating a behavioral risk based on identifying that the remote vehicle does not exist in the roadway environment.

19. The system of claim 14, wherein analyzing the V2X data to determine that the remote vehicle does not exist in the roadway environment comprises:

conducting a cross-validation analysis on the V2X data to determine that the remote vehicle does not exist in the roadway environment based on one or more of the context data of the remote vehicle, the registration data of the remote vehicle or a second set of sensor data, wherein the second set of sensor data includes one or more of remote sensor data received from the remote vehicle, ego sensor data generated by the ego vehicle or other sensor data received from one or more other endpoints.

20. The system of claim 19, wherein the computer code, when executed by the onboard vehicle computer system, causes the onboard vehicle computer system to conduct the cross-validation analysis on the V2X data to determine that the remote vehicle does not exist in the roadway environment at least by:

performing one or more of a cross-validation for traffic-related information or a cross-validation for service-related information to generate a cross-validation result based on a data cross-comparison of the one or more of the context data of the remote vehicle, the registration data of the remote vehicle or the second set of sensor data;

identifying one or more abnormal activities based on the cross-validation result; and generating one or more abnormality features for the one or more abnormal activities.

\* \* \* \* \*